US008929674B2

(12) United States Patent
Liu et al.

(10) Patent No.: US 8,929,674 B2
(45) Date of Patent: Jan. 6, 2015

(54) COMPRESSION OF HIGH BIT-DEPTH IMAGES

(75) Inventors: Qiang Liu, Seattle, WA (US); David Robert James Monaghan, Eastwood (AU); Dixon De Sheng Deng, East Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 417 days.

(21) Appl. No.: 13/471,147

(22) Filed: May 14, 2012

(65) Prior Publication Data

US 2013/0004072 A1    Jan. 3, 2013

(30) Foreign Application Priority Data

Jun. 29, 2011    (AU) ................................ 2011203169

(51) Int. Cl.
| | | |
|---|---|---|
| G06K 9/36 | (2006.01) | |
| H04N 19/169 | (2014.01) | |
| H04N 19/34 | (2014.01) | |
| H04N 19/154 | (2014.01) | |
| H04N 19/18 | (2014.01) | |
| H04N 19/625 | (2014.01) | |

(52) U.S. Cl.
CPC ... *H04N 19/00333* (2013.01); *H04N 19/00442* (2013.01); *H04N 19/002* (2013.01); *H04N 19/00296* (2013.01); *H04N 19/00812* (2013.01)
USPC ............................ 382/250; 382/232; 382/239

(58) Field of Classification Search
None
See application file for complete search history.

(56) References Cited

U.S. PATENT DOCUMENTS

| | | | |
|---|---|---|---|
| 5,805,293 A | 9/1998 | Mochizuki | |
| 5,838,834 A | 11/1998 | Saito | |
| 6,614,939 B1* | 9/2003 | Yamauchi | 382/240 |
| 6,754,384 B1 | 6/2004 | Spaulding et al. | |
| 2001/0048770 A1* | 12/2001 | Maeda | 382/243 |
| 2003/0123744 A1* | 7/2003 | Chui et al. | 382/240 |
| 2003/0133499 A1* | 7/2003 | Chen et al. | 375/240.2 |

(Continued)

FOREIGN PATENT DOCUMENTS

| | | |
|---|---|---|
| CN | 101729896 A | 6/2010 |
| CN | 101917622 A | 12/2010 |

OTHER PUBLICATIONS

Weiping Li, "Overview of Fine Granularity Scability in MPEG-4 Video Standard", IEEE Transactions on Circuits and Systems for Video Technogoy, IEEE Service Center, Piscataway, NJ, US vol. 11, No. 3, Mar. 1, 2001.

(Continued)

*Primary Examiner* — Sean Motsinger
(74) *Attorney, Agent, or Firm* — Canon USA Inc IP Division

(57) ABSTRACT

A method of storing an image is disclosed. A frequency-domain representation of the image is received, the frequency-domain representation having a plurality of bit-planes. The frequency-domain representation is divided into a first set of bit-planes and a second set of bit-planes, the first set of bit-planes being a higher set of bit-planes than the second set of bit-planes. The first set of bit-planes and the second set of bit-planes is partitioned into a plurality of partitions. At least one partition from the second set of bit-planes is inserted into the plurality of partitions of the first set of bit-planes to produce a plurality of arranged partitions of the image. The arranged partitions of the image are stored.

15 Claims, 13 Drawing Sheets

(56) References Cited

U.S. PATENT DOCUMENTS

| | | | |
|---|---|---|---|
| 2005/0053301 A1* | 3/2005 | Chui et al. | 382/239 |
| 2007/0160305 A1 | 7/2007 | Demos | |
| 2008/0031535 A1 | 2/2008 | Shi | |
| 2012/0189215 A1* | 7/2012 | Deshpande | 382/232 |
| 2012/0189223 A1* | 7/2012 | Fukuhara | 382/248 |

OTHER PUBLICATIONS

Sharon Peng et al., "Adaptive frequency weighting for fine-granularity-scability", Visual Communications and Image Processing; Jan. 21-23, 2002; San Jose.

Hong Jiang et al, "Using Frequency Weighting in FGS Bit-lane Coding for Natural Video" 50 MPEG Meeting, Jun. 12, 1999-Oct. 12, 1999, Maui (Motion Pictureexpert Group or ISO/IEC JTC1/SC29/WG11), No. M5489, Nov. 29, 1999.

Yi-Shin Tung et al., "Encoding strategies for realizing MPEG-4 universal scalable video coding" Visual Communications and Image Processing, Aug. 7, 2003-Nov. 7, 2003; Lugano Jul. 8, 2003.

Weiping Li, "Frequency Weighting for FGS", 50, MPEG Meeting Jun. 12, 1999-Oct. 12, 1999 Maui (Motion Picture Expert Group or ISO/IEC JTC1/SC29/WG11), No. M5589, 1999.

* cited by examiner

COMPRESSION OF HIGH BIT-DEPTH IMAGES

REFERENCE TO RELATED PATENT APPLICATION

This application claims the benefit under 35 U.S.C. §119 of the filing date of Australian Patent Application No. 2011203169, filed Jun. 29, 2011, hereby incorporated by reference in its entirety as if fully set forth herein.

FIELD OF INVENTION

The present invention relates to image processing and, in particular, to a method and apparatus for storing a bitmap image. The present invention also relates to a computer program product including a computer readable medium having recorded thereon a computer program for storing a bitmap image.

DESCRIPTION OF BACKGROUND ART

Current bitmap images are commonly encoded in eight (8) bit per color channel formats. In this instance, for a particular color channel, a total number of two-hundred and fifty-six (256) shades of color can be represented. Typically, two-hundred and fifty-six (256) shades of color per channel are enough for many photographic, display and printing needs.

However, with increased usage of high bit-depth medical images, graphical displays and large format printers, there is a need for a method to encode sixteen (16) bit per color channel images to provide a finer level of color gradients within a particular color channel. The finer level of color gradients is required as the human eye is able to distinguish color gradients to a greater number of levels than two-hundred and fifty-six (256).

There are a number of conventional methods for encoding sixteen (16) bit images. All of the conventional methods encode sixteen (16) bit images through the use of a primary image and a residual image in the spatial domain. The primary and residual images are combined to produce the original (or a lossy approximation of the original) sixteen (16) bit image.

The Joint Photographic Experts Group (JPEG) defines a method of lossy compression for bitmap images. JPEG compression allows lossy compression of bitmap images through the use of frequency domain encoding of image data. As an example, FIG. 3A shows a portion of a bitmap image 301. During a typical JPEG compression process, the bitmap image 301 is first divided into coding blocks (e.g., 311) of eight (8) by eight (8) pixels. A discrete cosine transform (DCT) is applied to each coding block to produce an eight (8) by eight (8) block of frequency domain coefficients. FIG. 3B shows an eight (8) by eight (8) block 305 of frequency domain coefficients produced by applying a DCT to the coding block 311. As seen in FIG. 3B, the block 305 comprises a DC coefficient 315 located at position (0, 0) and sixty-three (63) AC coefficients (e.g., 316) arranged in a zig-zag order 325. The higher the order of a particular AC coefficient (e.g., 316), the higher the frequency of energies that the particular AC coefficient encodes. In the spatial domain, high frequency energies within the image represent fast-varying values, and low frequency energies represent slow-varying gradients.

Following on from the DCT transform step, the sixty four (64) DCT coefficients are then quantized using a quantization table. Typically, the quantization table will quantize higher order AC coefficients to a greater degree. The greater quantization is due to the fact that the higher frequency energies that the AC coefficients encode can typically be represented with a smaller number of bits. Differing levels of quantization of the DCT coefficients can be used to control the size of the final coded image. Finally, the quantized DCT coefficients are losslessly encoded, for example using Huffman encoding.

Aside from quantization, one other method of controlling the size of a final coded image is to discard DCT coefficients of the image, starting from a highest frequency level coefficient and stopping once a desired memory target is reached. Such a method works because the majority of visual information in an image is encoded within the DC and lower AC coefficients.

A method of spectral JPEG encoding of images will now be described with reference to FIG. 4A and FIG. 4B. FIG. 4A shows DCT coefficients 410 of a coding block for an eight (8) bit image. For each such DCT coding block, the DCT coefficients 410 are stored within spectral bands of decreasing visual quality of the image. Increasing order of DCT coefficients is directly related to the decreasing impact of the DCT coefficients on visual quality of the image. Hence, the DCT coefficients 410 can be grouped into spectral partitions (e.g., 415 and 425) that are sorted by decreasing relevance to the overall image quality. In such an arrangement, the image quality can be degraded gradually through deletion of higher spectral partitions and their associated DCT coefficients. In this way it is possible to reclaim memory adaptively, by removing less relevant partitions first. For example, in an event that extra memory is required, partition AC55-AC63 in FIG. 4B is deleted first to reclaim the memory adaptively. The partition AC55-AC63 is deleted first because this partition is the least visually significant. If more memory is required, the next least visually significant partition AC45-AC54 is deleted to reclaim further memory.

FIG. 4A shows the partitioning of the DCT coefficients 410 with partitions 1 and 2 referenced as 415 and 425. FIG. 4B is a table showing a partitioning scheme for the DCT coefficients 410 of FIG. 4A. As seen in FIG. 4B, partition 1 (415) comprises the DC coefficient and partition 2 (425) comprises AC coefficients AC1, AC2 and AC3.

One limitation of the JPEG compression method is that it is only defined for images of up to twelve (12) bits per color component.

A need exists for a method of encoding high bit-depth images (i.e., greater than eight (8) bits).

SUMMARY OF THE INVENTION

It is an object of the present invention to substantially overcome, or at least ameliorate, one or more disadvantages of existing arrangements.

Disclosed are arrangements which seek to address the above problems by providing a method of encoding high bit-depth images, without reducing the image into an eight bit image in the spatial domain. The disclosed method also allows decompression of such a high bit-depth encoded image using by a standard JPEG decompressor.

According to one aspect of the present disclosure there is provided a method of storing an image, said method comprising:

receiving a frequency-domain representation of the image, said frequency-domain representation having a plurality of bit-planes;

dividing the frequency domain representation into a first set of bit-planes and a second set of bit-planes, said first set of bit-planes being a higher set of bit-planes than the second set of bit-planes;

partitioning each of the first set of bit-planes and the second set of bit-planes into a plurality of partitions;

inserting at least one partition from the second set of bit-planes into the plurality of partitions of the first set of bit-planes to produce a plurality of arranged partitions of the image; and storing the arranged partitions of the image.

According to another aspect of the present disclosure there is provided a method of storing an image, said method comprising:

receiving a 16-bit frequency-domain representation of the image, said frequency-domain representation having 16-bit bit-planes;

dividing the frequency domain representation into a first set of 8-bit bit-planes and a second set of 8-bit bit-planes, said first set of 8-bit bit-planes being a higher set of bit-planes than the second set of 8-bit bit-planes;

partitioning each of the first set of bit-planes and the second set of bit-planes into a plurality of partitions;

inserting at least one partition from the second set of bit-planes into the plurality of partitions of the first set of bit-planes to produce a plurality of arranged partitions of the image; and storing the arranged partitions of the image.

According to still another aspect of the present disclosure there is provided an apparatus for storing an image, said method comprising:

means for receiving a high bit-depth frequency-domain representation of the image, said frequency-domain representation having a plurality of bit-planes;

means for dividing the high bit-depth frequency domain representation into a first bit-plane portion set of bit-planes and a second bit-plane portion set of bit-planes, said first bit-plane portion set of bit-planes having being a higher set of bit-planes than the second bit-plane portion set of bit-planes;

means for partitioning each of the first bit-plane portion set of bit-planes and the second bit-plane portion set of bit-planes into a plurality of partitions;

means for inserting at least one partition from the second bit-plane portion set of bit-planes into the plurality of partitions of the first bit-plane portion set of bit-planes to produce a plurality of arranged partitions of the image; and means for storing the arranged partitions of the image.

According to still another aspect of the present disclosure there is provided a system for storing an image, said system comprising:

a memory for storing data and a computer program;

a processor coupled to said memory for executing said computer program, said computer program comprising instructions for:

receiving a high bit-depth frequency-domain representation of the image, said frequency-domain representation having a plurality of bit-planes;

dividing the high bit-depth frequency domain representation into a first set of bit-planes and a second set of bit-planes, said first set of bit-planes being a higher set of bit-planes than the second set of bit-planes;

partitioning each of the first set of bit-planes and the second set of bit-planes into a plurality of partitions;

inserting at least one partition from the second set of bit-planes into the plurality of partitions of the first set of bit-planes to produce a plurality of arranged partitions of the image; and storing the arranged partitions of the image.

Other aspects of the invention are also disclosed.

BRIEF DESCRIPTION OF THE DRAWINGS

One or more embodiments of the invention will now be described with reference to the following drawings, in which.

DETAILED DESCRIPTION OF EMBODIMENTS OF THE INVENTION

Figure 1:
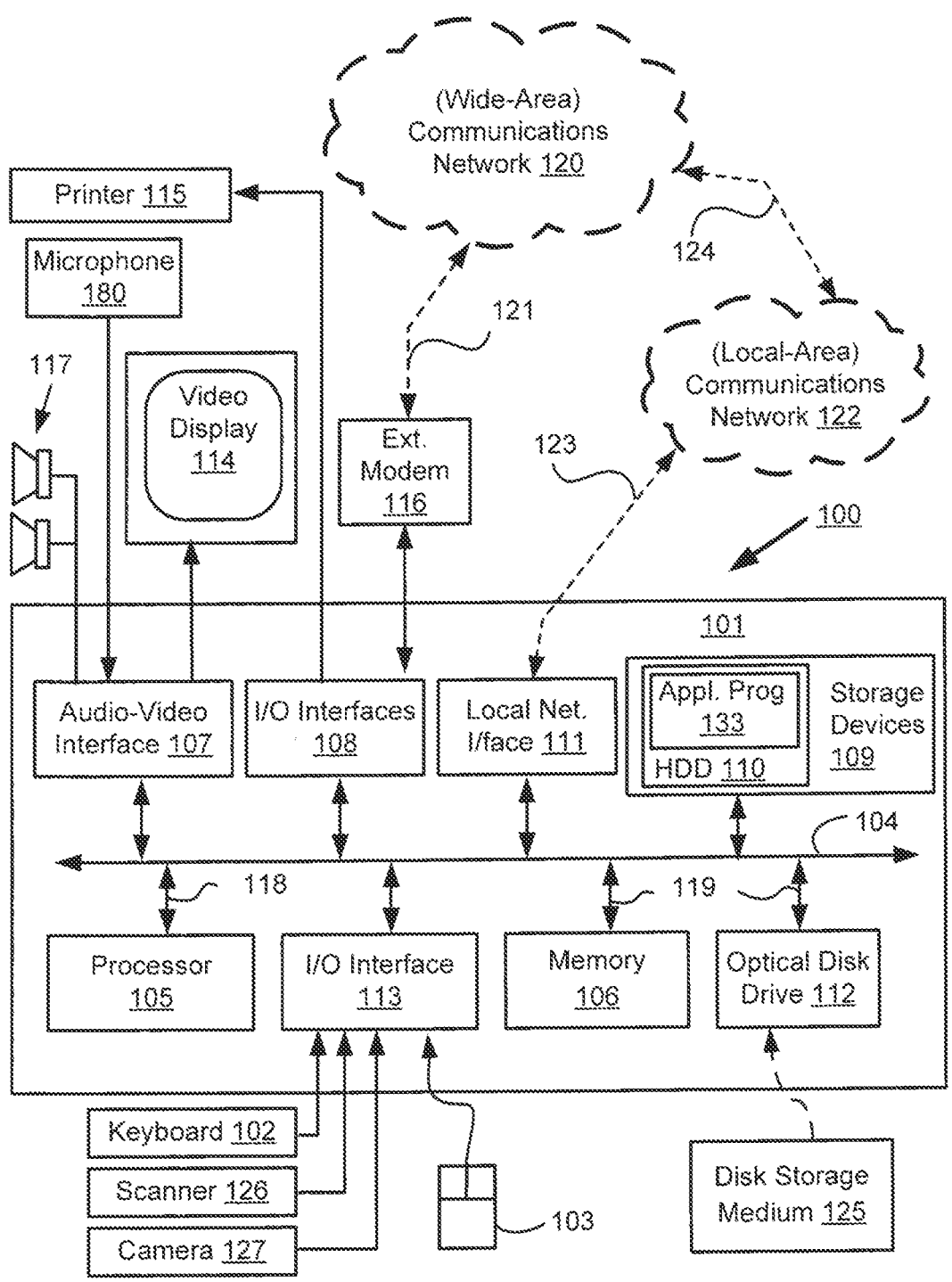
FIGS. 1 and 2 form a schematic block diagram of a general purpose computer system upon which arrangements described can be practiced.

Where reference is made in any one or more of the accompanying drawings to steps and/or features, which have the same reference numerals, those steps and/or features have for the purposes of this description the same function(s) or operation(s), unless the contrary intention appears.

As described above, one limitation of the JPEG compression method is that it is only defined for images of up to twelve (12) bits per color component. The JPEG compression method may be extended to incorporate sixteen (16) bit or higher images. In particular, the JPEG compression method may be extended in conjunction with the residual image method described above, by partitioning a high bit-depth image into two or more low bit-depth images that are JPEG compliant. The low bit-depth images may then be JPEG encoded separately. Such a partition comprises a primary image, as well as one or more residual images. However, residual images of high bit-depth images are typically very noisy, and hence are not suited to JPEG compression.

For a high bit-depth value that will be bit partitioned into two parts, a more significant bit portion representing higher order bit-planes will be referred to below as a "high bit-plane portion", and a less significant bit portion representing lower order bit-planes will be termed a "low bit-plane portion".

Methods of storing a high bit-depth image (i.e., having a bit depth greater than eight (8) bits) are described below with reference to FIGS. 5 to 10. The described methods utilize a JPEG compressor for compressing the high bit-depth image and are an extension of the spectral partition JPEG encoding method described above with reference to FIGS. 3A, 3B, 4A and 4B. The methods will be described below by way of example with reference to a sixteen (16) bit image. However, the described methods may be extended to other high bit-depth images.

Figure 2:
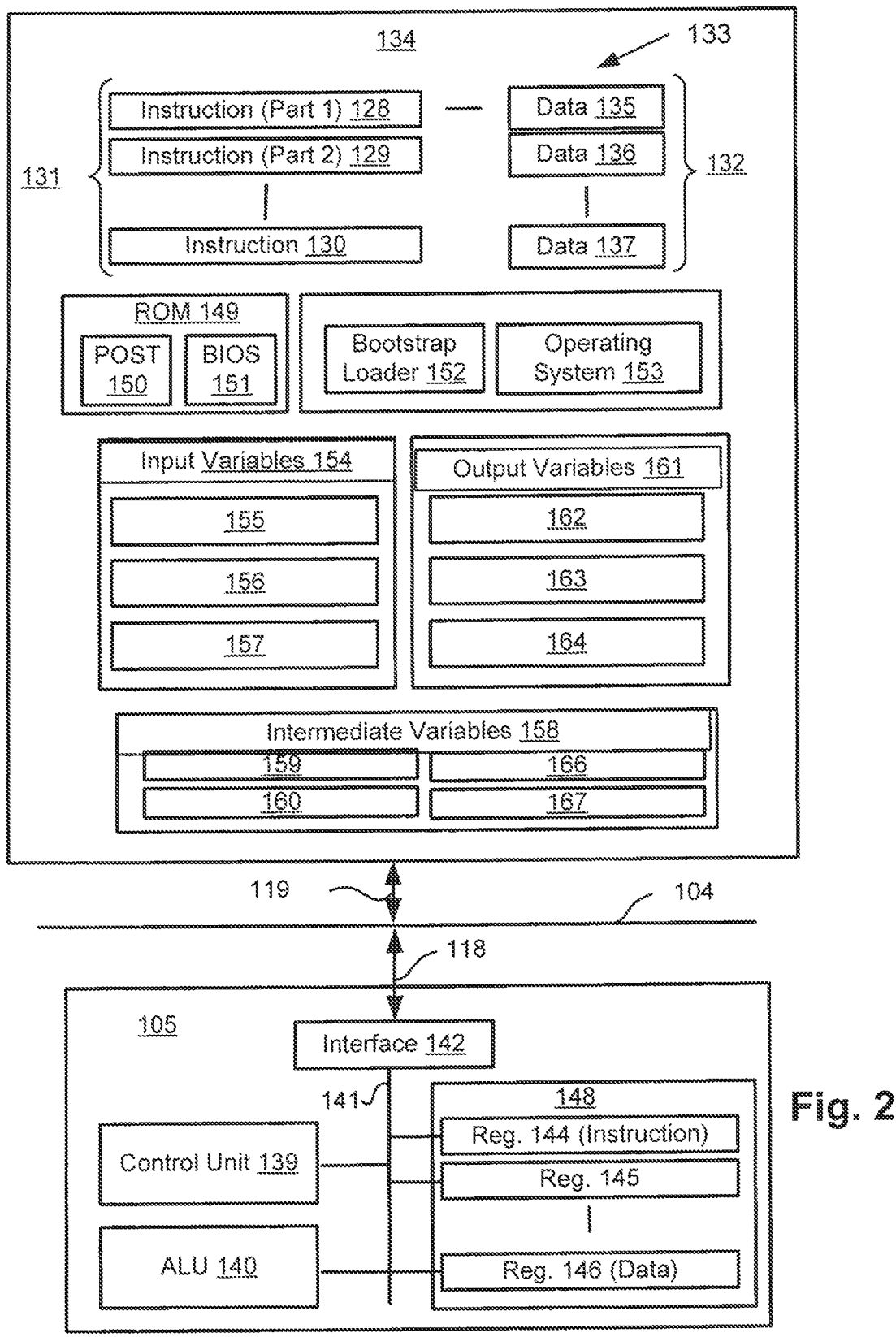

FIGS. 1 and 2 depict a general-purpose computer system 100, upon which the described methods can be practiced. As seen in FIG. 1, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes a number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1, the local communications network 122 may also couple to the wide network 120 via a connection 124, which would typically include a so-called "firewall" device or device of similar functionality. The local network interface 111 may comprise an Ethernet™ circuit card, a Bluetooth™ wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practiced include IBM-PC's and compatibles, Sun Sparcstations, Apple Mac™ or a like computer systems.

The described methods may be implemented using the computer system 100 wherein the processes of FIGS. 5 to 10, to be described, may be implemented as one or more software application programs 133 executable within the computer system 100. In particular, the steps of the described methods are affected by instructions 131 (see FIG. 2) in the software 133 that are carried out within the computer system 100. The software instructions 131 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 100 from the computer readable medium, and then executed by the computer system 100. A non-transitory computer readable medium having such software or computer program recorded on the computer readable medium is a computer program product. The use of the computer program product in the computer system 100 preferably effects an advantageous apparatus for implementing the described methods.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 2 is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1.

When the computer module 101 is initially powered up, a power-on self-test (POST) program 150 executes. The POST program 150 is typically stored in a ROM 149 of the semiconductor memory 106 of FIG. 1. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfill various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1 must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 2, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 1105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1. The execution of a set of the instructions may in some cases result in output of data. Execution may also involve storing data or variables to the memory 134.

The described methods use input variables 154, which are stored in the memory 134 in corresponding memory locations 155, 156, 157. The described methods produce output variables 161, which are stored in the memory 134 in corresponding memory locations 162, 163, 164. Intermediate variables 158 may be stored in memory locations 159, 160, 166 and 167.

Referring to the processor 105 of FIG. 2, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128, 129, 130;
(b) a decode operation in which the control unit 139 determines which instruction has been fetched; and
(c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 5 to 10 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

Figure 5:
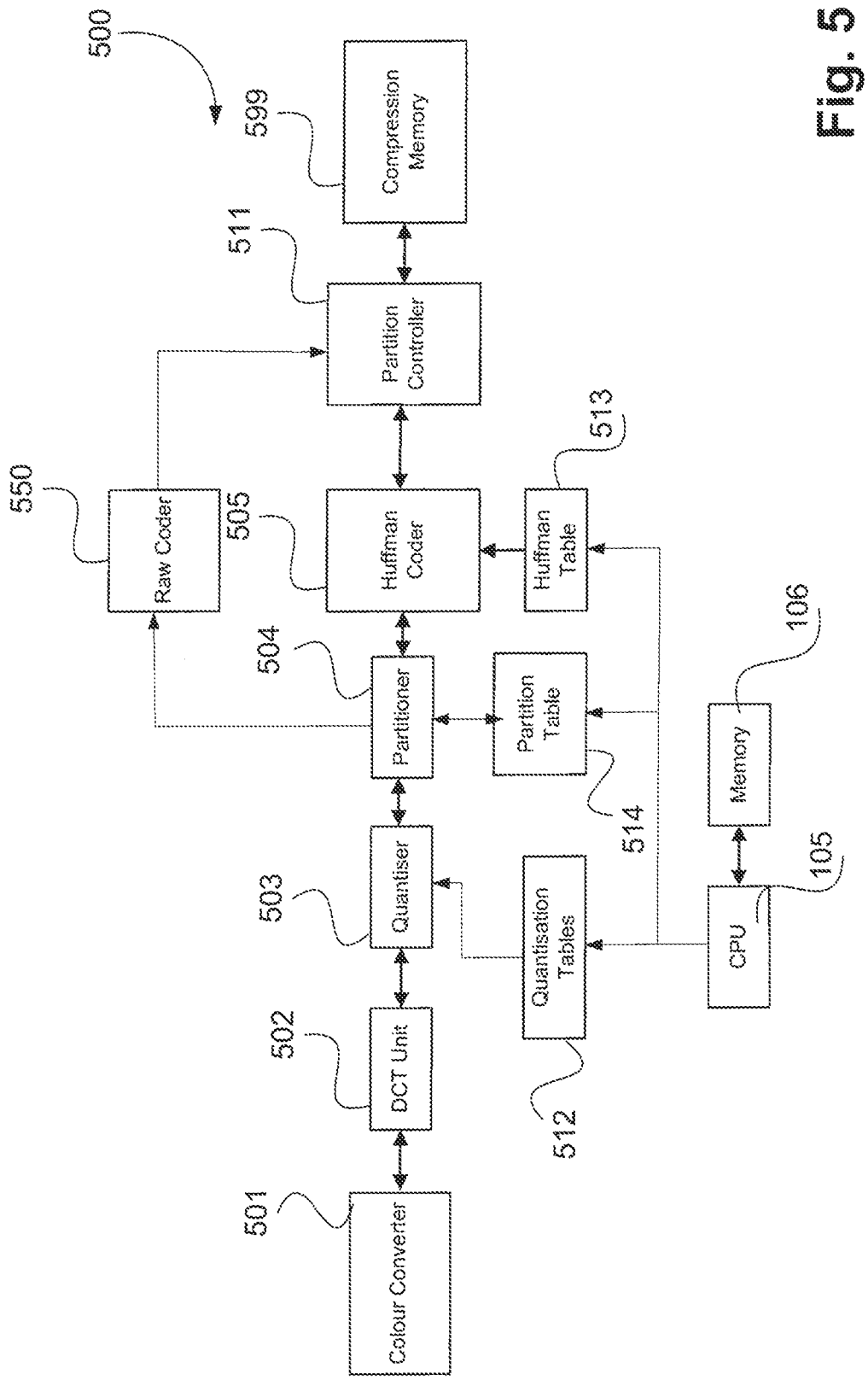
FIG. 5 shows an example software architecture for practicing the described arrangements.

FIG. 5 shows one example software architecture 500 for implementing the described methods. As seen in FIG. 5, the software architecture 500 comprises software modules 501, 502, 503, 504, 505, 511, 550 and 599. The software modules 501, 502, 503, 504, 505, 511, 550 and 599 may be used to implement an "extended spectral JPEG compressor".

Each of the software modules 501, 502, 503, 504, 505, 511, 550 and 599 of the software architecture 500 may be implemented as one or more code modules of the software application program 133 resident on the hard disk drive 110 and being controlled in its execution by the processor 105.

As seen in FIG. 5, a color converter module 501 converts input image data into a correct processing color space if required. In accordance with the example described below, the color converter module 501 converts input image data into the Red Green Blue (RGB) color space. Alternatively, input image data may also be converted to the YCbCr color space.

Figure 8A:
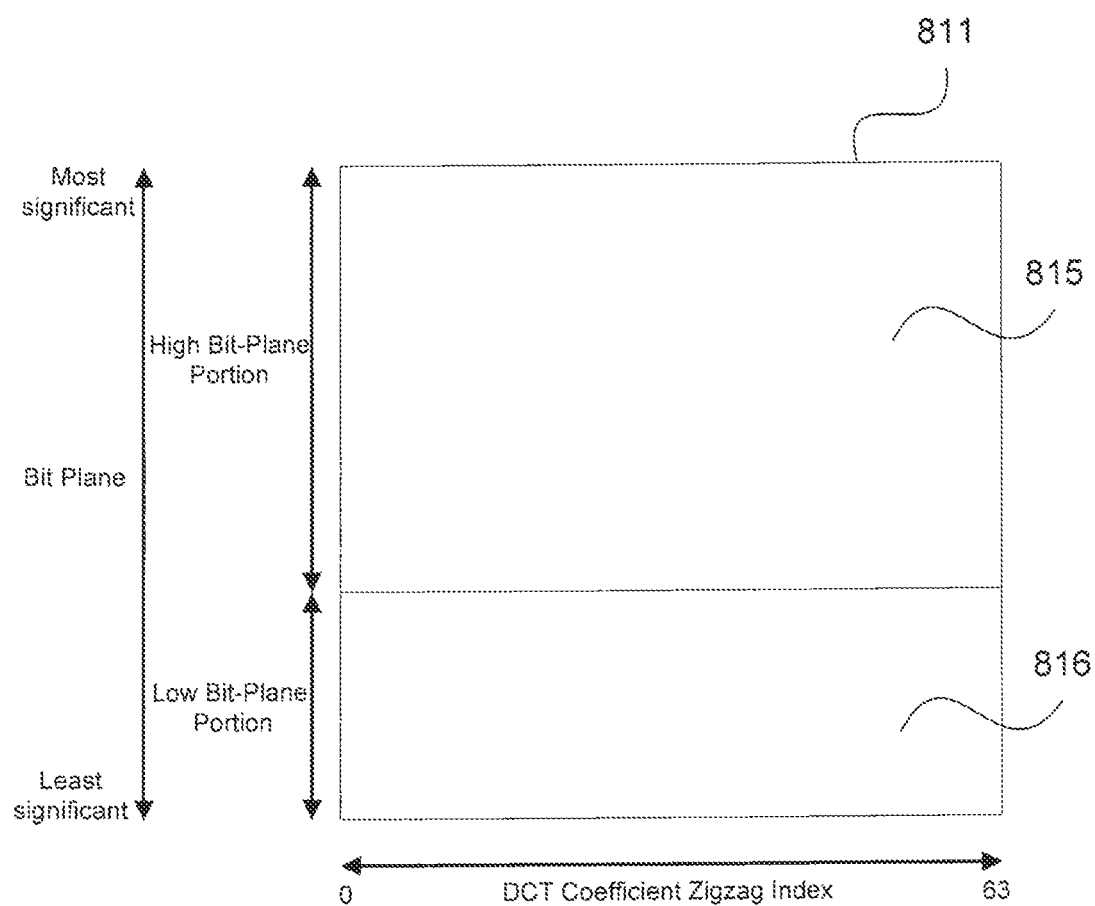
FIG. 8A is a schematic block diagram showing a block of high bit-depth DCT coefficient data partitioned into a high bit-plane and a low bit-plane portion.
Figures 8B, 8C, 8D:
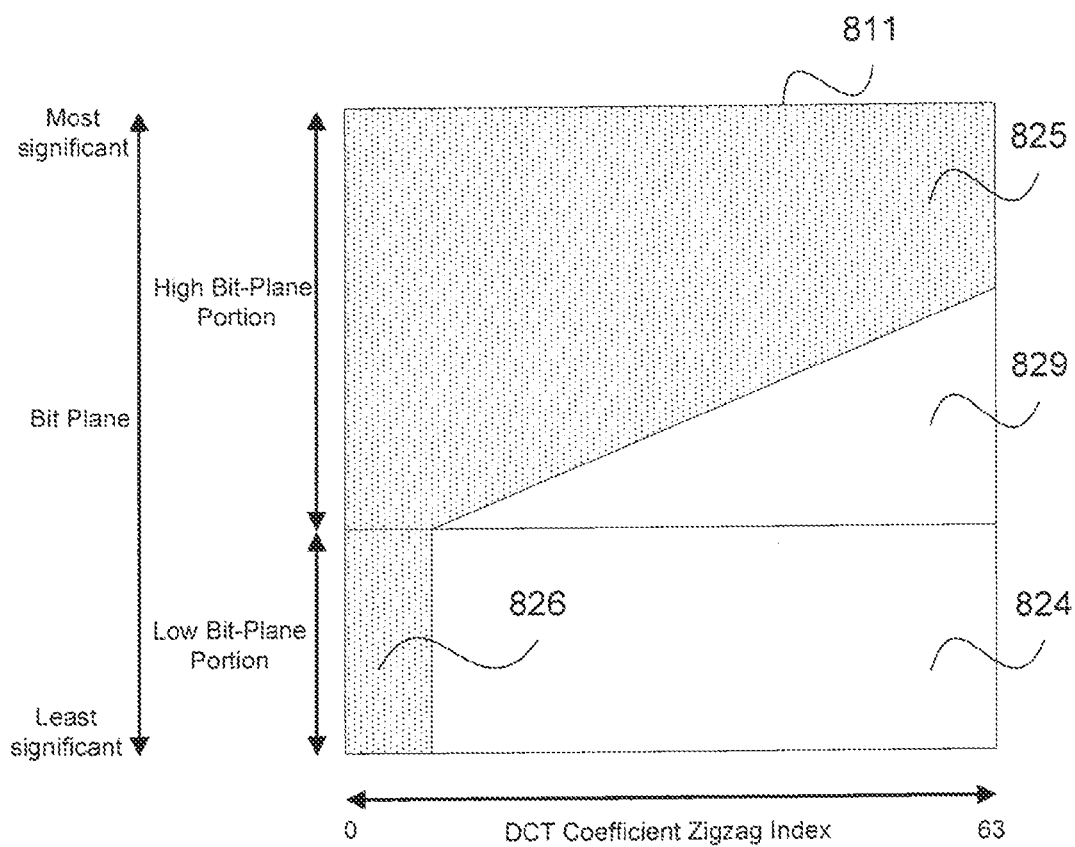
FIG. 8B is a schematic block diagram showing the block of DCT coefficient data of FIG. 8A after quantizing the high bit-plane and low bit-plane portions.
FIG. 8C shows a modified standard JPEG quantization table.
FIG. 8D shows a quantization table for use in quantizing the low bit-plane portion of DCT coefficient data of FIG. 8A.

A DCT unit module 502 performs a DCT for the RGB input image data in units of eight (8) by eight (8) blocks, outputting DCT coefficients. In one implementation, the DCT unit module 502 compresses the input image using a JPEG compression method. As mentioned before, the JPEG compression method is defined for images of up to twelve (12) bits per color component. Thus, before the input image is sent to the DCT unit module 502, the image is divided into a high bit-plane portion and a low bit-plane portion in the spatial domain. The DCT unit module 502 then separately converts the spatial-domain high bit-plane portion and the low bit-plane portion to the frequency domain equivalents 815 and 816. A quantizer module 503, under execution of the processor 105, quantizes the eight (8) by eight (8) spatial-domain blocks of DCT coefficients using two quantization tables 512. The two quantization tables 512 comprise a JPEG quantization table and a modified quantization table. The quantizer module 503 outputs quantized coefficients. Example quantization tables 827 and 828 are shown in FIGS. 8C and 8D, respectively. The quantization tables 827 and 828 may be accessed by the processor 105 from the memory 106.

Figure 3A:
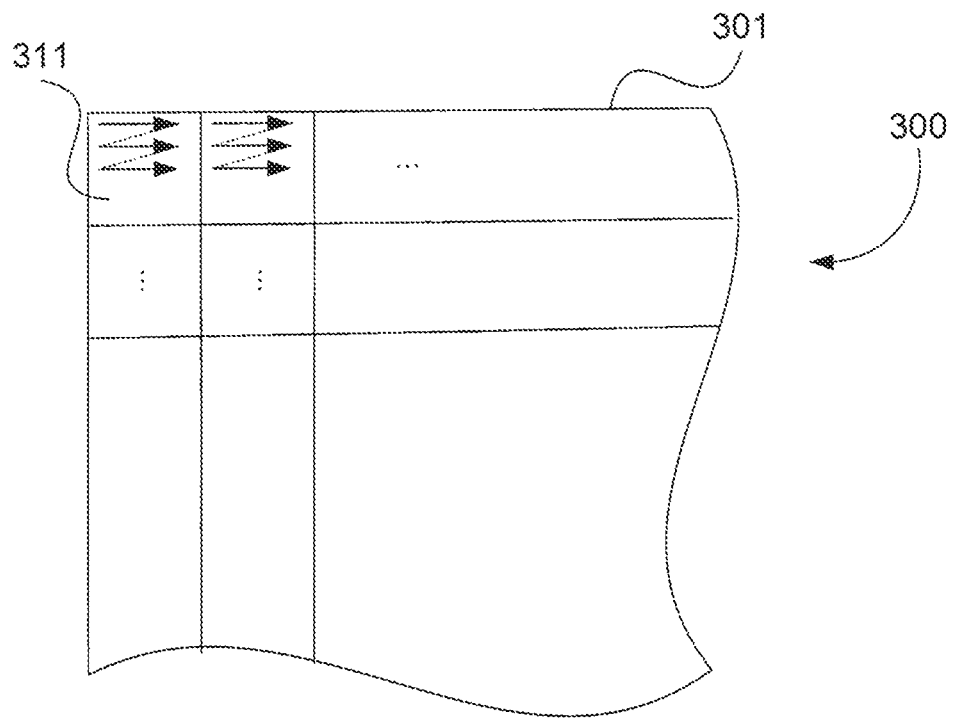
FIG. 3A is a schematic diagram of a bitmap image divided up into coding units for JPEG encoding.
Figure 3B:
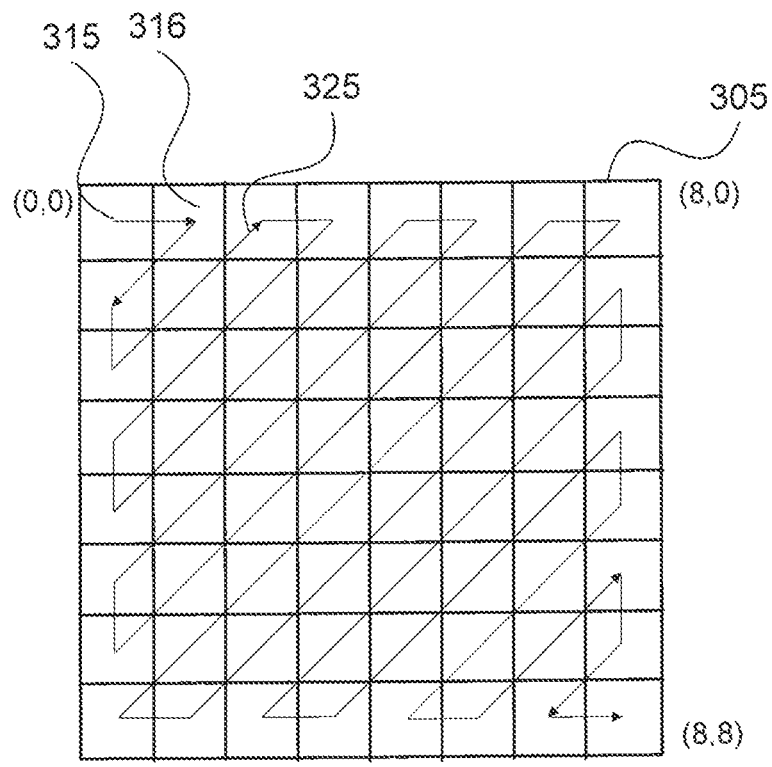
FIG. 3B is a schematic diagram of an eight (8) by eight (8) DCT block.
Figures 4A, 4B:
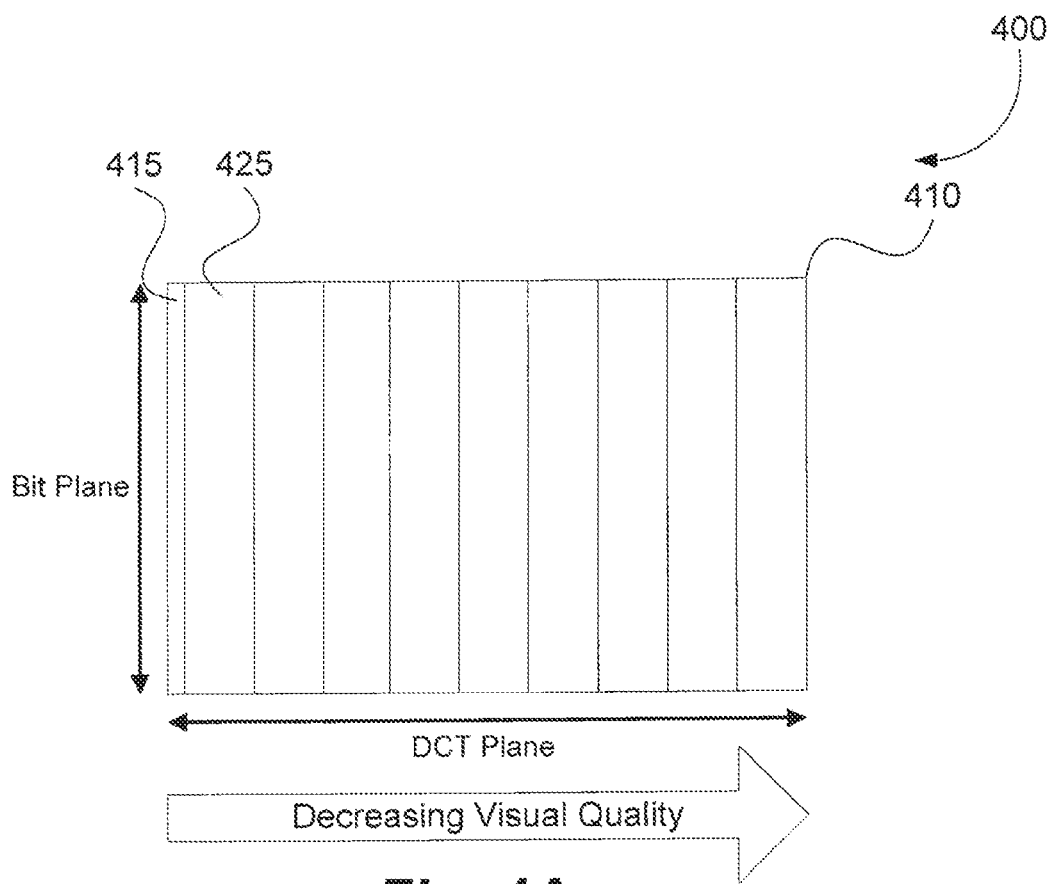
FIG. 4A is a schematic diagram of quality partitions in the DCT domain for an eight (8) bit image.
FIG. 4B is a table showing a partitioning scheme for eight (8) bit images according to one example.

The quantizer 503 also rearranges the eight (8) by eight (8) blocks of quantized coefficients into sixty-four (64) one-dimensional quantized coefficients from lower-frequency components to higher-frequency components in accordance with a scan in a zigzag order as shown in FIG. 3B. The quantized coefficients are then divided by partitioner module 504 into quality partitions according to a partition table 514. The partitioning is done along the visual quality axis, which means that the partitioning is performed according to the frequency level of the DCT coefficients. In one particular implementation, DC coefficients of the DCT data are assigned a partition, AC1-AC3 of the DCT data is assigned a second partition, AC4-AC7 of the DCT data is assigned a third partition, and so forth. The partitioner module 504 supplies the quality partitions to either a Huffman coder module 505 or a RAW coder module 550.

The Huffman coder module 505, under execution of the processor 105, encodes the input one-dimensional data in the quality partitions using a Huffman table 513 and any suitable Huffman encoding method. The Huffman coder module 505 outputs coded data, length ("code length" represented by number of bits) of each coded data, and a number (to be referred to as a "partition number" hereinafter) representing a partition to which the corresponding coded data is assigned. The RAW coder module 550 encodes one-dimensional data in the quality partitions as a single partition, and outputs raw coded data as well as a partition number representing a partition to which the corresponding coded data is assigned.

On the basis of the "partition number", a partition controller module 511 writes compressed data, corresponding to a partition indicated by the "partition number", into a compression memory module 599 configured within the memory 106. The compression memory module 599 is divided into partitions (e.g., 842, 849) (see FIG. 8F), and each piece of encoded data is written in a partition corresponding to the partition number of that data.

Figure 6:
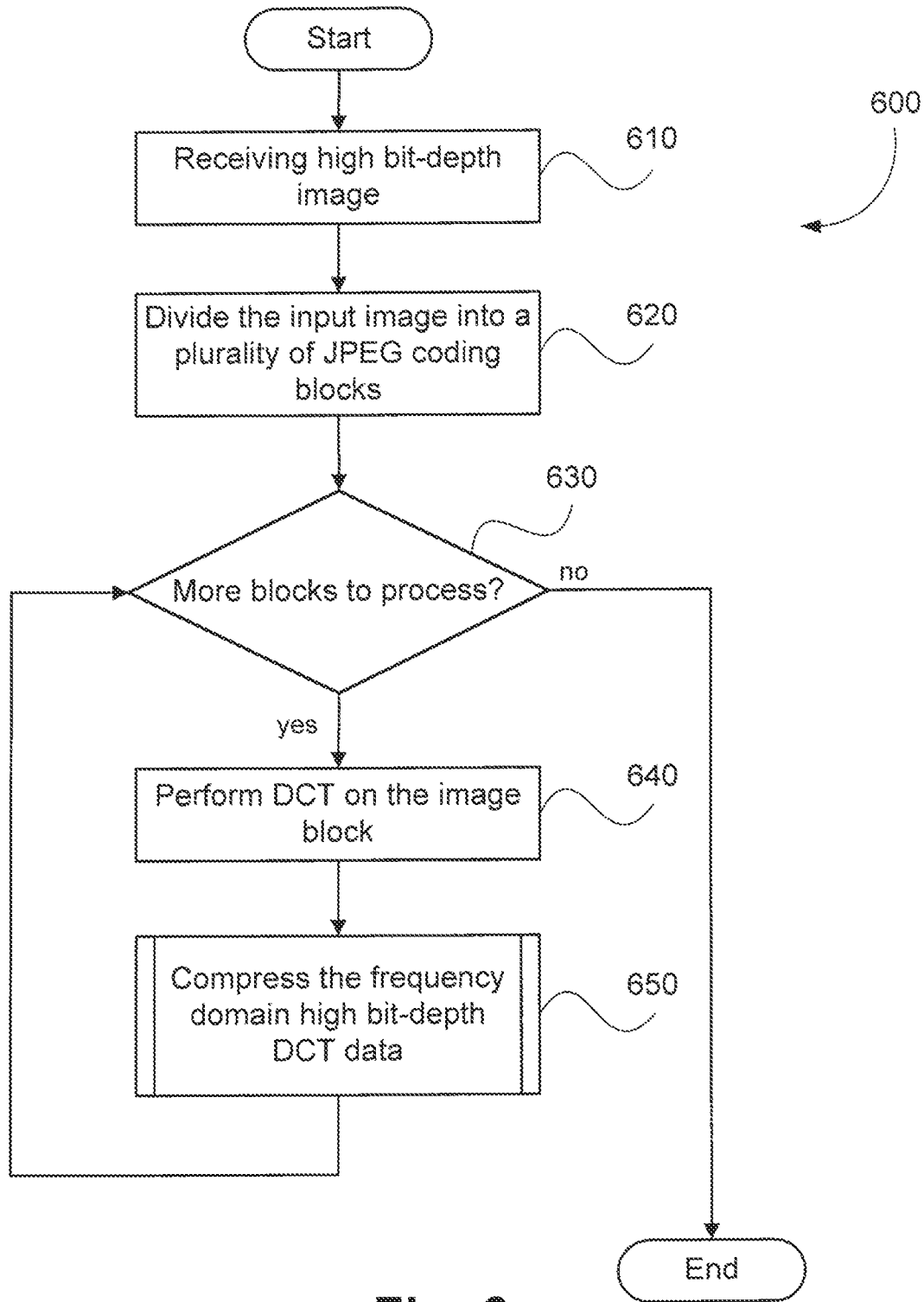
FIG. 6 is a flow diagram showing a method of storing sixteen (16) bit images.
Figure 7:
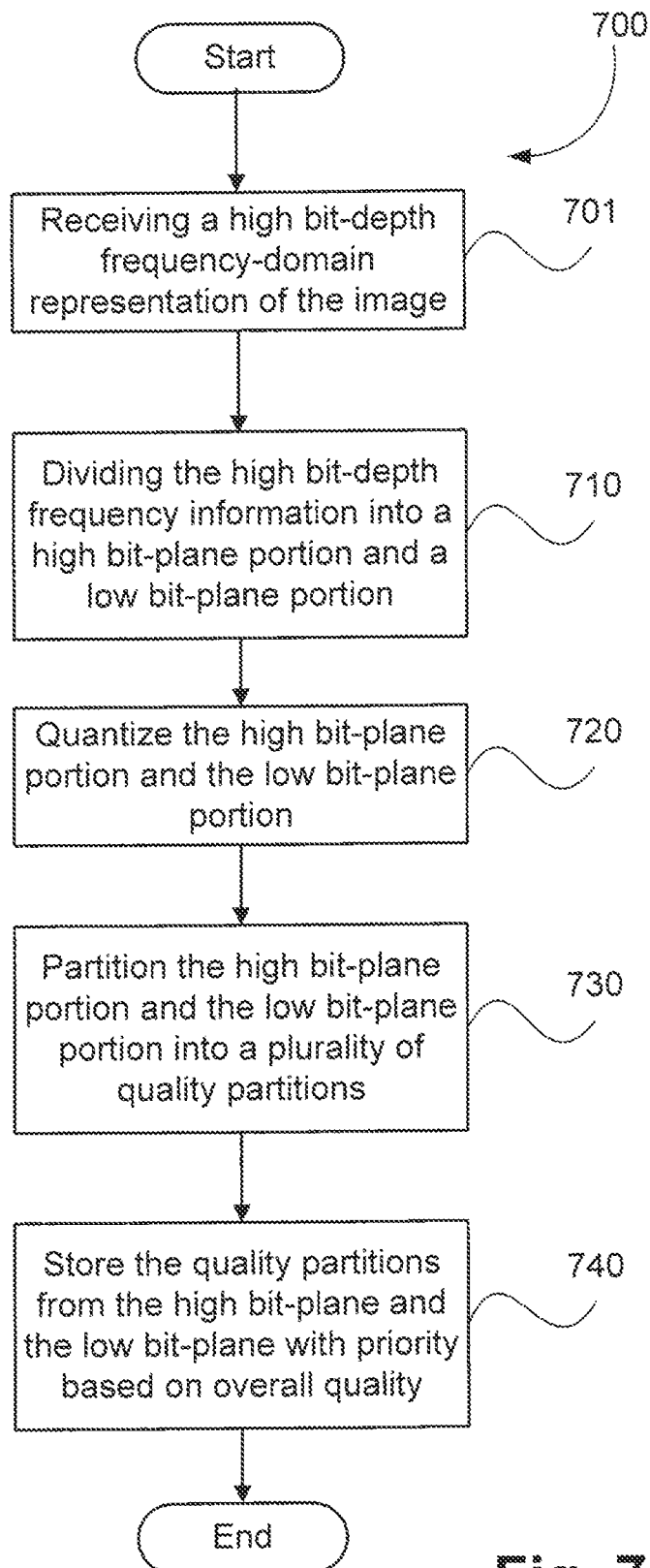
FIG. 7 is a flow diagram showing a method of encoding high bit-depth DCT coefficient data.

A method 600 of storing sixteen (16) bit images, will now be described with reference to FIG. 6. The method 600 may be implemented by the software modules 501, 502, 503, 504, 505, 511, 550 and 599, resident on the hard disk drive 110 and being controlled in their execution by the processor 105. As described above, the software modules 501, 502, 503, 504, 505, 511, 550 and 599 implement an extended spectral JPEG compressor to encode the sixteen (16) bit images in the format described above. The software modules 501, 502, 503, 504, 505, 511, 550 and 599 may form one or more code modules of the software application program 133.

The method 600 begins at inputting step 610, where an input comprising a high bit-depth image is received by the DCT unit module 502 from the color converter module 501. At dividing step 620, the DCT unit module 502, under execution of the processor 105, divides the image into blocks of eight (8) by eight (8) pixels, also known as coding blocks. The coding blocks may be stored in the memory 106 or storage device 109. At decision step 630, if the processor 105 determines that there are more coding blocks to be processed, then the method 600 proceeds to step 640. Otherwise, the method 600 concludes.

At transforming step 640, the DCT unit module 502, under execution of the processor 105, applies a discrete cosine transform (DCT) to a current coding block. The DCT may be either applied using floating point numbers, or using a fixed point scheme. The output from the DCT unit module 502 at step 640 is a block of high bit-depth DCT coefficient data. For 16-bit images the block of coefficient data output by the DCT unit module 502 at step 640 may be up to twenty-three (23) bits per DCT coefficient using integers. The block of high bit-depth DCT coefficient data output by the DCT unit module 502 may be stored in the memory 106.

Then at encoding step 650, the high bit-depth DCT coefficient data output by the DCT unit module 502 is encoded. A method 700 of encoding the high bit-depth DCT coefficient data, as executed at step 650, will be described in detail below with reference to FIG. 7. The method 700 will be described by way of example with reference to a block of high bit-depth DCT data 811 represented in FIG. 8A.

FIG. 8A to FIG. 8F, show the state of the block of high bit-depth DCT data 811 at each step of the method 700. The method 700 may be implemented by one or more of the software modules 503, 504, 505, 511, 550 and 599, resident on the hard disk drive 110 and being controlled in their execution by the processor 105. The software modules 501, 502, 503, 504, 505, 511, 550 and 599 may form one or more code modules of the software application program 133.

The method 700 begins at inputting step 701, where quantizer module 503 performs the step of receiving a high bit-depth frequency-domain representation of the image. In particular, the quantizer module 503 receives input comprising the block of high bit-depth DCT coefficient data 811 output by the DCT unit module 502.

At dividing step 710, the quantizer module 503, under execution of the processor 105, performs the step of dividing the high bit-frequency domain representation into a high bit-plane portion and a low bit-plane portion. In accordance with the example of FIG. 8A, at step 710, the quantizer module 503 separates the block of high bit-depth DCT coefficient data 811 into a low bit-plane portion 816 and a high bit-plane portion 815 as seen in FIG. 8A. In one implementation, the high bit-plane portion 815 contains fifteen (15) bits of information, corresponding to the maximum number of bits that may be encoded using a standard JPEG Huffman table. In this instance, the low bit-plane portion 816 contains the remaining bits of information. For 16-bit images, the low bit-plane portion 816 contains eight (8) bits of information.

At a quantizing step 720, quantizer module 503, under execution of the processor 105, applies a quantization process to both the low bit-plane 816 and the high bit-plane portion 815 of the DCT coefficient data 811. Accordingly, the high bit-plane portion 815 and the low bit-plane portion 816 of the high bit-depth frequency domain representation (i.e., the high bit-depth DCT coefficient data 811) are quantized at step 720. FIG. 8B shows the block of DCT coefficient data 811 after quantization at step 720.

A first quantization table is used, at step 720, for quantizing the high bit-plane portion 815 and a second quantization table is used for quantizing the low bit-plane portion 816. In particular, for the high bit-plane portion 815, a modified standard JPEG quantization table 827, as seen in FIG. 8C, may be used to produce quantized data 825, with some lower frequency DCT coefficients in the high bit-plane portion unquantized. In the quantization process, a portion of the bits in the higher frequency DCT coefficient 829 are removed. In this particular example, the quantization depends on the visual significance or frequency level of the DCT coefficient. The DC component and lower AC coefficients are not quantized, and the quantization level increases as the frequency level of the DCT coefficient increases. The low bit-plane portion 816 may be quantized using a table 828 as seen in FIG. 8D such that only a portion of data 826 corresponding to lower frequency DCT coefficients (for example, the data corresponding to DC and AC1-AC3 level coefficients) in the low bit-plane portion remain unquantized. The quantization process removes the portion of the bits in the higher frequency components of the DCT coefficients 824 by quantizing all DCT coefficients of the low bit-plane portion which are higher than a predetermined frequency level 824 to zero.

As discussed above, high bit-depth images are desirable for providing finer gradation than eight (8) bit images. Such finer gradation is especially noticeable in areas of an image with slowly varying gradient information. In terms of bit depth, extra gradient levels are encoded within a low bit-plane portion of bit data for the image. Such extra gradient levels occur in both the spatial and the DCT domain of image data. Furthermore, within the DCT domain, different DCT coefficients encode different energy frequencies of the image. The DC and lower few AC coefficients encode most of the low frequency energies of the image, which correspond to slow varying gradients in the spatial domain.

Based on the above discussed extra gradient levels and on different DCT coefficients encoding different energy frequencies, it is possible to determine the most relevant portion of low bit-plane data within the DCT domain that needs to be stored following quantizing step 720. In one implementation, the low bit-plane portion of the DC coefficient and first five (5) AC coefficients of the DCT coefficient data 811 are stored in the memory 106 at step 720 following quantizing of the DCT coefficient data 811. The low bit-plane information encoded for DCT coefficients with higher coefficient numbers, is less relevant.

Figure 8E:
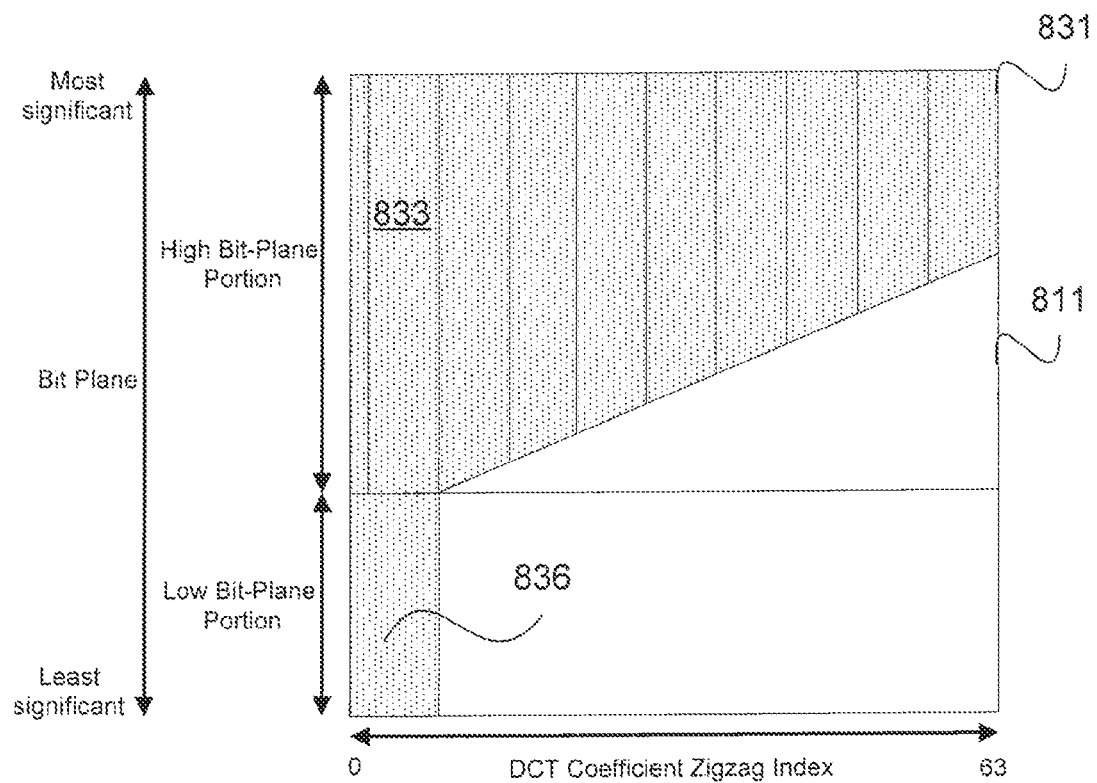
FIG. 8E is a schematic block diagram showing the high bit-plane and low bit-plane portions of FIG. 8A partitioned into quality partitions.

At partitioning step 730, partitioner module 504, under execution of the processor 105, performs the step of partitioning the quantized high bit-plane portion data 825 and the quantized low bit-plane portion data 826 of the block of DCT coefficient data 811 into a plurality of quality partitions (high bit-plane portion 831 and low bit-plane portion 836), respectively, as seen in FIG. 8E. Typically, the quantized high bit-plane portion data 825 and the quantized low bit-plane portion data 826 are partitioned at step 730 into at least three quality partitions. The high bit-plane portion data 825 is partitioned into spectral partitions of the high bit-plane portion 831 sorted by decreasing relevance to overall image quality, in a similar manner to the partitioning of the DCT coefficients 410 of FIG. 4A. For the low bit-plane portion data 826, the portion of data 826 is partitioned into a single partition 836 as seen in FIG. 8E.

In one implementation, the high bit-depth frequency-domain representation is partitioned into the one or more quality partitions (e.g., 831, 836) at step 710 prior to the high bit-plane portion 815 and low bit-plane portion 816 being formed. In such an implementation, step 710 and 730 described above are substantially swapped.

At encoding step 740, the quality partitions of the high bit-plane portion 831 of the low bit-plane portion data 826 is encoded by Huffman Coder module 505 and the quality partition 836 of the high bit-plane portion data 825 is encoded by raw coder module 550 The encoded quality partitions may then be stored by the processor 105 together in sorted order in compression memory module 599 by partition controller module 511, according to the individual quality significance of each partition (e.g., 833 and 836). Prior to storing the encoded quality partitions, the processor 105 performs the step of arranging the one or more quality partitions in order of decreasing visual significance. The arranged quality partitions may then be stored compression memory module 599.

Figures 8F, 8G:
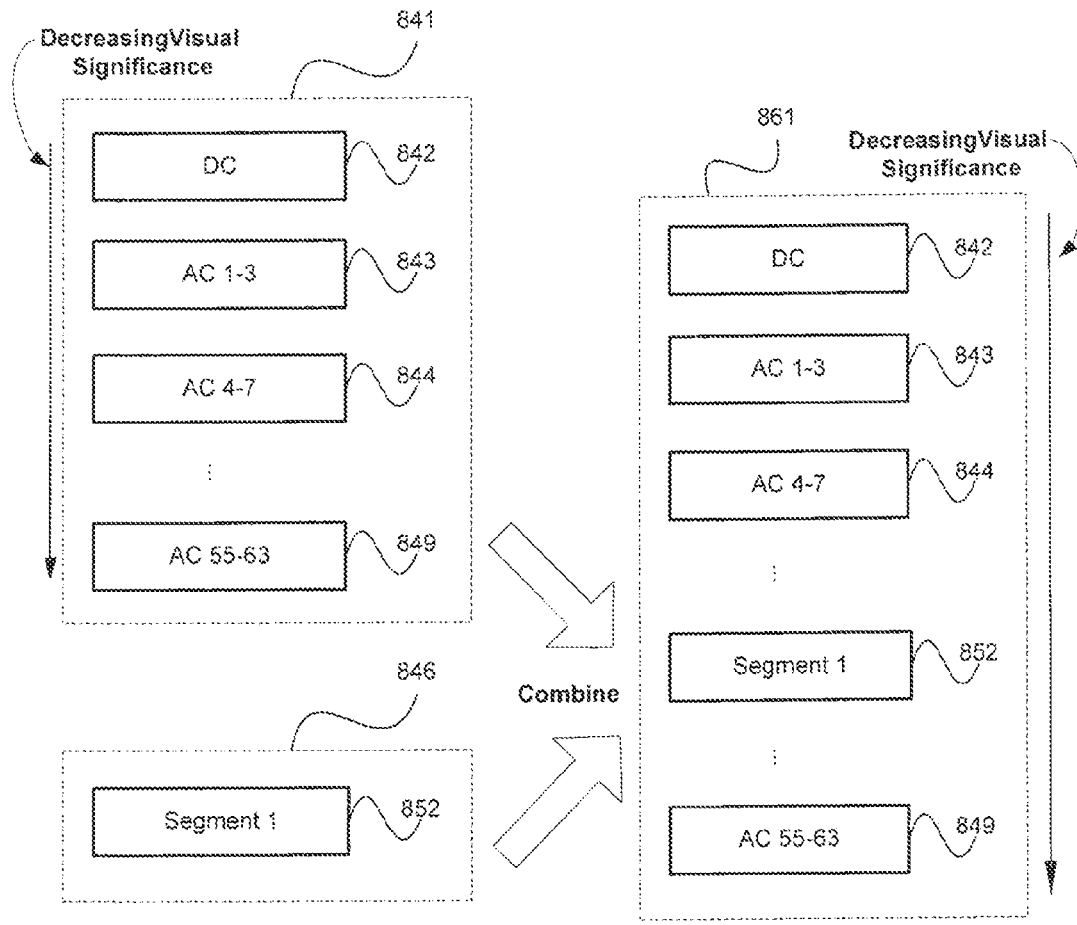
FIG. 8F shows two sets of quality partitions combined to form a common set of partitions.
FIG. 8G shows an example partition table.

FIGS. 8F and 8G show how the encoded data from each quality partition (e.g., 846) is combined and stored at step 740. As seen in FIG. 8F, two sets of Huffman encoded quality partitions of the low bit-plane portion 846 and of the high bit-plane portion 841 derived from the low bit-plane portion data 826 and high bit-plane portion data 825, respectively, are combined into a common set of partitions 861 in step 740 by the partition controller module 511, based on quality significance of the partitions of the low bit-plane portion 836 and of the high bit-plane portion 831. Individual quality significance of each partition (e.g., 833) is an amount of information that the particular partition contributes to overall image quality of the reconstructed image. In one implementation, the quality significance of partitions is predetermined based on visual quality. Visual quality measures such as mean square error (MSE), peak signal-to-noise ratio (PSNR), psycho-visual evaluation or any other suitable method may be used to determine the quality significance of a partition.

To determine where the quantized low bit-plane partition 836 should go, the partition 836 is inserted into a predetermined number of locations in the high bit-plane portion 831. For example, with reference to FIG. 8G, the inserted low bit-plane partition is referred to as "Segment 1", and is inserted between partitions AC35-AC44 and AC45-AC54. In the implementation of determining where "Segment 1" should go, "Segment 1" is also inserted between partitions 7 and 8, as well as between partitions 10 and 11, for example. Then, the visual quality measures of each of the high bit-plane partitions from DC to AC63 as well as "Segment 1" at different locations. In this particular example, the visual quality measure, such as the PSNR, of the high bit-plane partitions with "Segment 1" between partitions AC35-AC44 and AC45-AC54 is the highest of the three configurations. Thus, this location is selected by the processor 105 for the low bit-plane partition 852.

Using the predetermined visual quality, a partition table 514 may be constructed by the processor 105 by ranking the quality partitions of both the low bit-plane portion data 826 and the high bit-plane portion data 825. The partition table 514 used in one implementation is shown in FIG. 8G. As seen in FIG. 8G, partition number of the partition table 514 denotes quality significance of each partition, with one (1) denoting highest quality, and eleven (11) lowest quality. The partition table 514 is stored in memory 106 so that the image data in the Huffman-encoded partitions 861 can be decoded by a decoder in the processor 105. In one implementation, the Huffman encoded quality partitions of the high bit-plane portion 841 corresponding to quality partitions of the high bit-plane portion 831 for the high bit-plane portion data 825, contain partitions 842, 843, 844 etc. until a last partition 849, and the Huffman encoded quality partitions 846 corresponding to quality partitions 836 for the low bit-plane portion 826, containing partition 852, are combined into a common set of quality partitions 861 by slotting partition 852 in between the Huffman encoded partitions of the high bit-plane portion 841 according to the partition number of each partition.

In one implementation, the position of the partition 852 in the Huffman-encoded high bit-plane partitions 841 is determined by a user. A user may assess the effect of the different positions of the partition from the low bit-plane 852 in the resulting decoded JPEG image, and select the position that minimizes the visual distortion introduced by inserted low bit-plane partitions at different positions to the JPEG image, as detected by the user.

In another implementation, the position of the partition 852 is determined using visual quality measures such as the PSNR measure. The quality partitions 852 are inserted into a predetermined number of locations (e.g., three (3) locations). Using the quality partitions of FIG. 8G, the processor 105 calculates the PSNR measures of the Huffman-encoded quality partitions 861 with the low bit-plane partition 852 inserted between partitions 10 and 11, between partitions 8 and 10 and between partitions 7 and 8 respectively. By comparing the three different PSNR measures of the high bit-plane portion of data with different positions of the low bit-plane partition 852, the position of the partition 852 that gives the highest PSNR measure is selected for Huffman-encoding. In accordance with the example, the position between partitions 8 and 10 is selected by the processor 105 for the low bit-plane partition 852.

Figure 9:
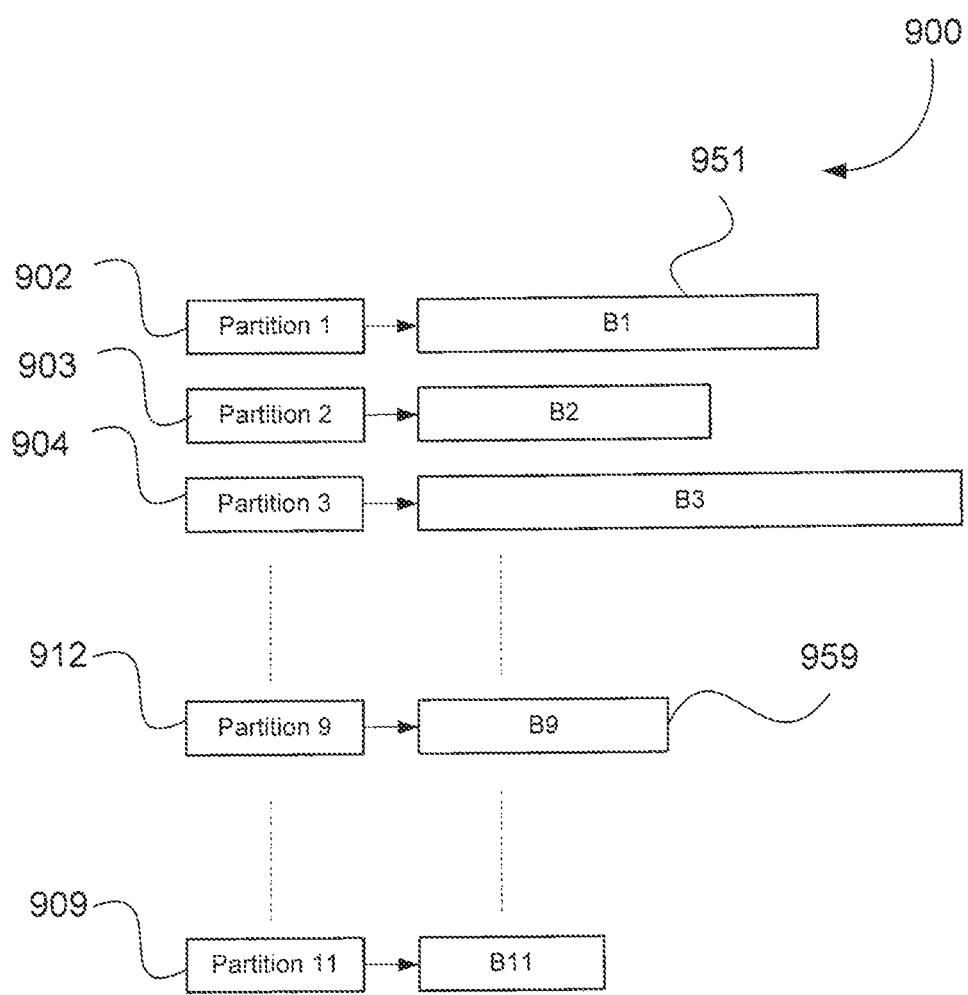
FIG. 9 is a schematic diagram showing quality partitions stored within memory.

FIG. 9 is a schematic diagram showing the Huffman encoded quality partitions (e.g., 842, 843, 844, 852, 849) stored within memory 106, in one implementation. The memory 106 containing data from quality partitions (e.g., 842, 843, 844, 852, 849) representing the compressed image consists of a plurality of headers and memory chunks, each "memory chunk" corresponding to a particular quality partition header. The partition headers store partition information such as a partition number, length of the partition, method to access an associated memory chunk, or other additional information as needed. The term "memory chunk" refers to one or more blocks of, not necessarily contiguous, memory linked together to form a logically contiguous chunk of memory for the purpose of storing compressed image data. Huffman coded DCT data for each partition is stored within the respective memory chunk. For example, in the present example, chunk 951, which stores Huffman encoded partition data 842, is associated with a header 902 for 'partition 1', while chunk 959, which stores Huffman encoded partition data 852, is associated with a header 912 for 'partition 9'.

When a specific memory target is required, memory may be freed by deleting quality partitions starting from the partition with lowest quality. In this way, image quality of a final outputted image can be degraded only as much as required to satisfy memory resource requirements.

The methods described above may be used for compressing and storing a high bit depth image. As described above, the software modules 501, 502, 503, 504, 505, 511, 550 and 599 may be used to implement an "extended spectral JPEG compressor". The method 700 described in FIG. 7 may be reversed to decompress the encoded data from each quality partition (e.g., 846) which was combined and stored at step 740.

Figure 10:
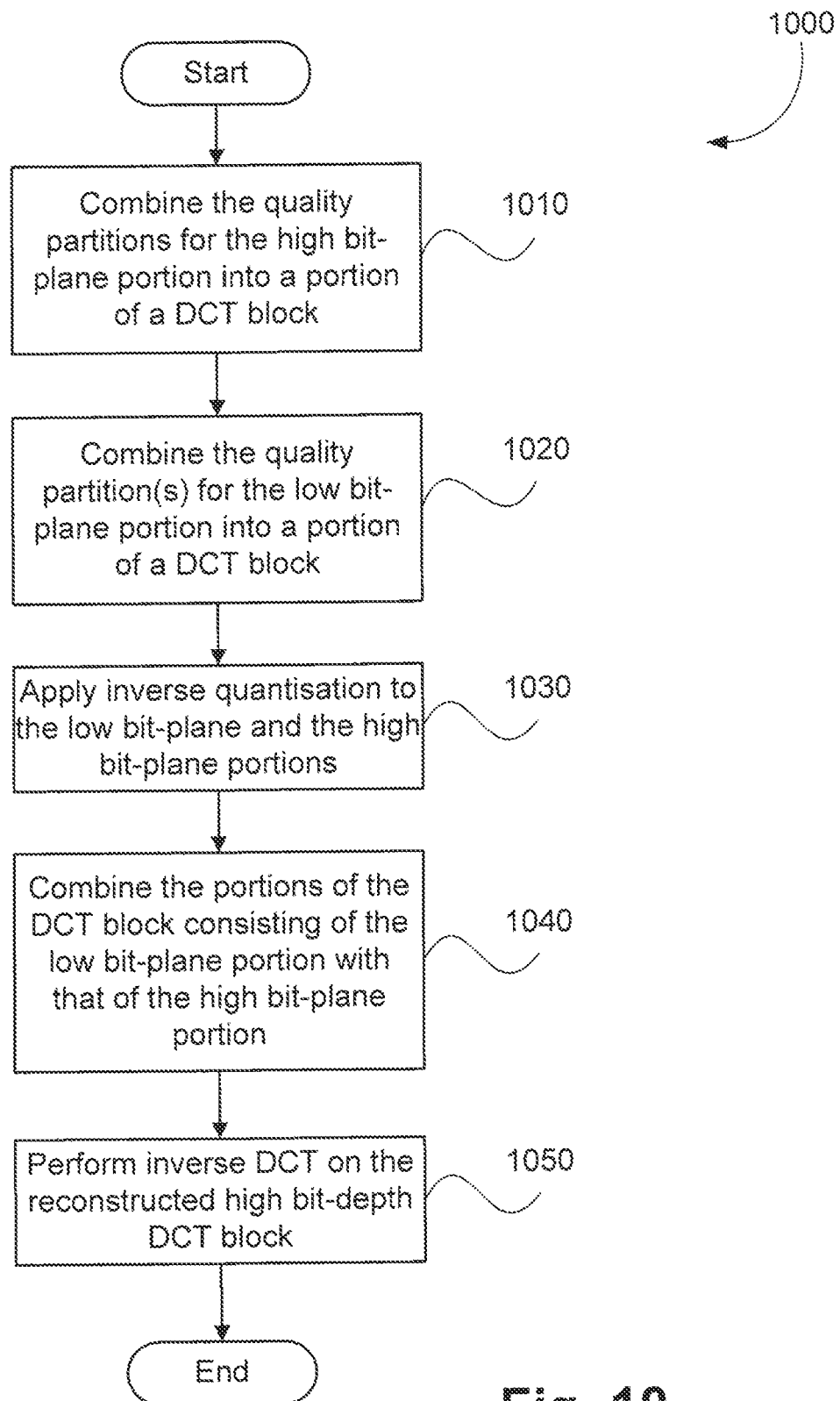
FIG. 10 is a flow diagram showing a method of decompressing a block of DCT data encoded in accordance with the method of FIG. 6.

A method 1000 of decompressing high bit-depth coefficient data encoded in accordance with the method 600, will now be described with reference to FIG. 10. The decompressing module may be resident on another computer receiving the compressed data comprising a processor 105 and memory 106. The decompressing module may also be resident on a rendering device such as a printer 115, which comprises an on-board processor and memory. The method 1000 will be described with reference to the example of FIGS. 8A to 8G. The method 1000 may be used to decompress the encoded data from each quality partition (e.g. 846) which was combined and stored at step 740.

The method 1000 may be implemented as one or more software code modules of the software application program 133 resident on the hard disk drive 110 and being controlled in its execution by the processor 105.

The method 1000 begins at combining step 1010, where the Huffman encoded quality partitions of the high bit-plane portion 841 corresponding to quality partitions 831 for the high bit-plane portion data 825 are decoded and combined by the processor 105 into a high bit-plane portion of DCT data which may be stored in the memory 106. In accordance with the example, of FIGS. 8A to 8G, the portion of data produced at step 1010 is at least similar to or substantially identical to the quantized data 825 as seen in FIG. 8B. With reference to FIG. 8G, all the partitions other than partition 9 labeled "Segment 1" is combined by the processor 105 to form the quantized high bit-plane portion of DCT data and stored in memory 106. The location of the partition containing the low bit-plane portion data (for example, the data corresponding to DC and AC1-AC3 level coefficients) is received from the compressing module resident on another computer.

Then at combining step 1020, the Huffman encoded quality partitions 846 corresponding to the quality partitions 836 for the low bit-plane portion data 826 is decoded and combined into a second, low bit-plane portion of DCT data which may be stored in the memory 106. The low bit-plane portion of data produced at step 1020, is at least similar to or substantially identical to the data 826 as seen in FIG. 8B. With reference to FIG. 8G, partition 9 labeled "Segment 1" is used to generate the quantized low bit-plane portion of the DCT data and stored in memory 106.

The method 1000 continues at inverse quantization step 1030, where inverse quantization is applied by the processor 105 to both the high bit-plane portion and the low bit-plane portion of DCT data constructed and stored at steps 1010 and 1020 respectively. Any suitable inverse quantization method may be used at step 1030. One implementation performs inverse quantization on the high bit-plane portion of the DCT data constructed by step 1010 by multiplying each high bit-plane DCT coefficient by its corresponding value in a high bit-plane quantization table such as example quantization table 827, while the low bit-plane portion of the DCT data constructed by step 1020 is inverse quantized by multiplying each low bit-plane DCT coefficient by its corresponding value in a low bit-plane quantization table such as example quantization table 828.

At combining step 1040, the high bit-plane and low bit-plane portions of DCT data are accessed in the memory 106 and combined by the processor 105 to produce a high bit-depth DCT block of coefficient data. The high bit-depth DCT block of coefficient data may be stored in the memory 106. In accordance with the example of FIGS. 8A to 8G, the high bit-depth DCT block of coefficient data produced at step 1040 is at least similar to or substantially identical to the high bit-depth DCT coefficient data 811 shown in FIG. 8A.

Then at step 1050, the block of high bit-depth DCT coefficient data produced at step 1040 is transformed into an eight (8) by eight (8) pixel image block using any suitable inverse DCT method.

In one implementation, if a corresponding modified JPEG decompressor suitable for executing the method 1000 is unavailable, then a standard JPEG decompressor may be used after the compressed data is pre-processed. In accordance with such an implementation, for each coding block, the pre-processing consists of discarding partitions associated with the low bit-plane portions of DCT data, and concatenating the remaining partitions—consisting of the partitioned DCT coefficients—into a single memory partition.

INDUSTRIAL APPLICABILITY

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive. For example, it is possible to change many of the parameters associated with the method 600 for different types of input images. Modifications can include, but are not limited to, amount and type of quantization of the low bit-plane portion of DCT data and the high bit-plane portion of DCT data. For example, instead of using different quantization tables to quantize the high bit-plane and low bit-plane portions of the DCT coefficient data, the method 600 can be modified to use only one quantization table to quantize both the high bit-plane portion and low bit-plane portions of the DCT coefficient data.

Further, the partition strategy of the low bit-plane portion and the high bit-plane portion of DCT data may be modified. For example, instead of using a single partition, the low bit-plane portion of DCT data may be partitioned into multiple quality partitions based on the DCT coefficients, bit plane level or a combination of both.

The claims defining the invention are as follows:

1. A method of storing an image, said method comprising:
   receiving a frequency-domain representation of the image, said frequency-domain representation having a plurality of bit-planes;
   dividing the frequency domain representation into a first set of bit-planes and a second set of bit-planes, said first set of bit-planes being a higher set of bit-planes than the second set of bit-planes;
   partitioning each of the first set of bit-planes and the second set of bit-planes into a plurality of partitions;
   inserting at least one partition from the second set of bit-planes into the plurality of partitions of the first set of bit-planes to produce a plurality of arranged partitions of the image; and
   storing the arranged partitions of the image.

2. The method according to claim 1, wherein the plurality of arranged partitions of the image are arranged in an order of decreasing visual significance.

3. The method according to claim 2, wherein the order of decreasing visual significance is determined by a user assessing the visual distortion introduced by the inserted partitions from the second set of bit-planes at a plurality of different position.

4. The method according to claim 2, wherein the order of decreasing visual significance is determined by a method comprising the steps of:
   inserting the partition from the second set of bit-planes into a predetermined number of positions between the plurality of partitions of the first set of bit-planes to form a plurality of arranged partitions of the image;
   determining a visual quality measure for each of the plurality of arranged partitions of the image;
   selecting one of the plurality of arranged partitions of the image based on the determined visual quality measures.

5. The method according to claim 2, wherein the high bit-depth frequency domain representation is quantized.

6. The method according to claim 2, wherein the first set of bit-planes and the second set of bit-planes are quantized.

7. The method according to claim 1, wherein a first quantization table is used for quantizing the first set of bit-planes and a second quantization table is used for quantizing the second set of bit-planes.

8. The method according to claim 1, wherein the high bit-depth frequency-domain representation is partitioned into said one or more quality partitions prior to said first set of bit-planes and second set of bit-planes being formed.

9. A non-transitory computer readable medium encoded with instructions for performing the method according to claim 1.

10. A method of storing an image, said method comprising:
    receiving a 23-bit frequency-domain representation of the image, said frequency-domain representation having 23-bit bit-planes;
    dividing the frequency domain representation into a first set of 15-bit bit-planes and a second set of 8-bit bit-planes, said first set of 15-bit bit-planes being a higher set of bit-planes than the second set of 8-bit bit-planes;
    partitioning each of the first set of bit-planes and the second set of bit-planes into a plurality of partitions;
    inserting at least one partition from the second set of bit-planes into the plurality of partitions of the first set of bit-planes to produce a plurality of arranged partitions of the image; and
    storing the arranged partitions of the image.

11. The method according to claim 10, wherein the plurality of arranged partitions of the image are arranged in an order of decreasing visual significance.

12. An apparatus for storing an image, comprising:
    means for receiving a high bit-depth frequency-domain representation of the image, said frequency-domain representation having a plurality of bit-planes;
    means for dividing the high bit-depth frequency domain representation into a first set of bit-planes and a second set of bit-planes, said first set of bit-planes being a higher set of bit-planes than the second set of bit-planes;
    means for partitioning each of the first set of bit-planes and the second set of bit-planes into a plurality of partitions;
    means for inserting at least one partition from the second set of bit-planes into the plurality of partitions of the first set of bit-planes to produce a plurality of arranged partitions of the image; and
    means for storing the arranged partitions of the image.

13. The apparatus according to claim 12, wherein the plurality of arranged partitions of the image are arranged in an order of decreasing visual significance.

14. A system for storing an image, said system comprising:
    a memory for storing data and a computer program;
    a processor coupled to said memory for executing said computer program, said computer program comprising instructions for:
      receiving a high bit-depth frequency-domain representation of the image, said frequency-domain representation having a plurality of bit-planes;
      dividing the high bit-depth frequency domain representation into a first set of bit-planes and a second set of bit-planes, said first set of bit-planes being a higher set of bit-planes than the second set of bit-planes;

partitioning each of the first set of bit-planes and the second set of bit-planes into a plurality of partitions;

inserting at least one partition from the second set of bit-planes into the plurality of partitions of the first set of bit-planes to produce a plurality of arranged partitions of the image; and storing the arranged partitions of the image.

15. The system according to claim 14, wherein the plurality of arranged partitions of the image are arranged in an order of decreasing visual significance.

* * * * *